United States Patent [19]

Ohi

[11] Patent Number: 5,296,789
[45] Date of Patent: Mar. 22, 1994

[54] APPARATUS FOR CONTROLLING BRUSHLESS MOTORS IN RESPONSE TO SWITCHING TRANSISTOR TEMPERATURE

[75] Inventor: Shinichi Ohi, Ohsato, Japan

[73] Assignee: Zexel Corporation, Tokyo, Japan

[21] Appl. No.: 7,026

[22] Filed: Jan. 21, 1993

Related U.S. Application Data

[63] Continuation of Ser. No. 701,149, May 17, 1991, abandoned.

[30] Foreign Application Priority Data

May 18, 1990 [JP] Japan .................................. 2-128318

[51] Int. Cl.$^5$ ............................................. H02P 7/00
[52] U.S. Cl. .................................. 318/254; 318/439; 388/934
[58] Field of Search ............... 318/434, 254, 471, 439, 318/138, 472; 361/23, 25, 78, 88, 103, 106, 91; 388/809, 814, 815, 934

[56] References Cited

U.S. PATENT DOCUMENTS

| Re. 33,379 | 10/1990 | Bradio ........................ 388/934 X |
| 4,208,621 | 1/1980 | Hipkins et al. ..................... 318/138 |
| 4,360,852 | 11/1982 | Gilmore .......................... 361/106 X |
| 4,378,580 | 3/1983 | Stich ...................................... 361/91 |
| 4,574,226 | 3/1986 | Binder ................................. 318/434 |
| 4,626,753 | 12/1986 | Letterman ............................. 361/25 |
| 4,779,031 | 10/1988 | Arends et al. . |
| 4,829,416 | 5/1989 | Inada et al. ..................... 318/811 X |
| 5,008,771 | 4/1991 | Palera ................................... 361/103 |
| 5,038,088 | 8/1991 | Arendo et al. .................. 388/934 X |
| 5,123,081 | 6/1992 | Bachman et al. ................. 388/934 |

FOREIGN PATENT DOCUMENTS

| 3024613 | 1/1982 | Fed. Rep. of Germany ...... 388/934 |
| 0013989 | 1/1982 | Japan .................................. 388/934 |
| 1261076 | 9/1986 | U.S.S.R. ............................. 388/934 |

*Primary Examiner*—Jonathan Wysocki
*Attorney, Agent, or Firm*—Pollock, Vande Sande & Priddy

[57] ABSTRACT

A control apparatus for controlling a rotational speed of a brushless direct current motor in accordance with a duty cycle of a pulse signal for controlling by the use of switching transistors exciting current flowing pulsewise through exciting coils of the motor. The apparatus has a detector for detecting the temperature of the transistors and the frequency of the pulse signal is determined in response to the detector so as not to overheat the transistors. Thus, smooth rotation can be obtained in a way that ensures that the transistors will not heat excessively.

18 Claims, 4 Drawing Sheets

APPARATUS FOR CONTROLLING BRUSHLESS MOTORS IN RESPONSE TO SWITCHING TRANSISTOR TEMPERATURE

This application is a continuation of U.S. patent application Ser. No. 07/701,149 filed May 17, 1991, abandoned.

BACKGROUND OF THE INVENTION

1. Field of the Invention

The present invention relates to a control apparatus for brushless or commutatorless d.c. motors.

2. Description of the Prior Art

In the prior art there is known a control apparatus for brushless or commutatorless d.c. motors, in which the rotational speed of a brushless d.c. motor is controlled in accordance with the duty cycle of a control pulse signal for controlling the exciting currents flowing through the exciting coils of the motor in the pattern of the control pulse signal. Such type of control apparatus has a plurality of switching transistors for controlling the driving voltage and current supplied pulsewise to the exciting coils of the motor, and the rate of the conducting time of the switching transistors is controlled in response to a control pulse signal, whereby the levels of the voltage and the current supplied to the exciting coils are regulated in accordance with the duty cycle of the control pulse signal.

In the aforesaid control apparatus, the switching speed of the switching transistors has to be fast for obtaining smooth rotation of the brushless d.c. motor. However, the power consumed by the switching transistors when they are changed in their switching state produces heat in an amount proportional to the switching speed of the switching transistors. Therefore, high speed switching operation of the switching transistors may cause the temperature of the switching transistors to increase, whereby the switching transistors may burn out.

SUMMARY OF THE INVENTION

It is an object of the present invention to provide an improved apparatus for controlling brushless or commutatorless d.c. motors.

It is another object of the present invention to provide a brushless d.c. motor control apparatus which is capable of preventing the switching transistors for controlling the exciting current of the motor from overheating or burning out.

According to the control apparatus of the present invention, in a control apparatus for controlling a brushless d.c. motor, the control apparatus comprises a position sensor for detecting the rotational position of the rotor of the motor, a switching circuit means for selectively supplying exciting current to a plurality of coils located on the stator side of the motor, setting means for setting a desired set rotational speed of the motor, detecting means for detecting the temperature of the switching transistors of the switching circuit means, and a control means responsive to the position sensor for controlling the switching circuit means to supply the exciting current necessary for rotating the motor to the coils.

The control apparatus further comprises a generating means responsive to the setting means and the detecting means for generating a pulse signal whose duty cycle is related to the condition set by the setting means and whose frequency is related to the temperature detected by the detecting means. The pulse signal is input to a current control means means for controlling the exciting current in such a way as to be supplied in the pattern of the pulse signal.

Since the frequency of the pulse signal is determined in relation to the temperature of the switching transistors, it is possible to regulate the frequency of the pulse signal so as not to cause the temperature of the switching transistors of the switching circuit means to exceed a prescribed level. Thus, smooth operation of the motor will be obtained in a way that ensures that the switching transistors will not overheat or burn out.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
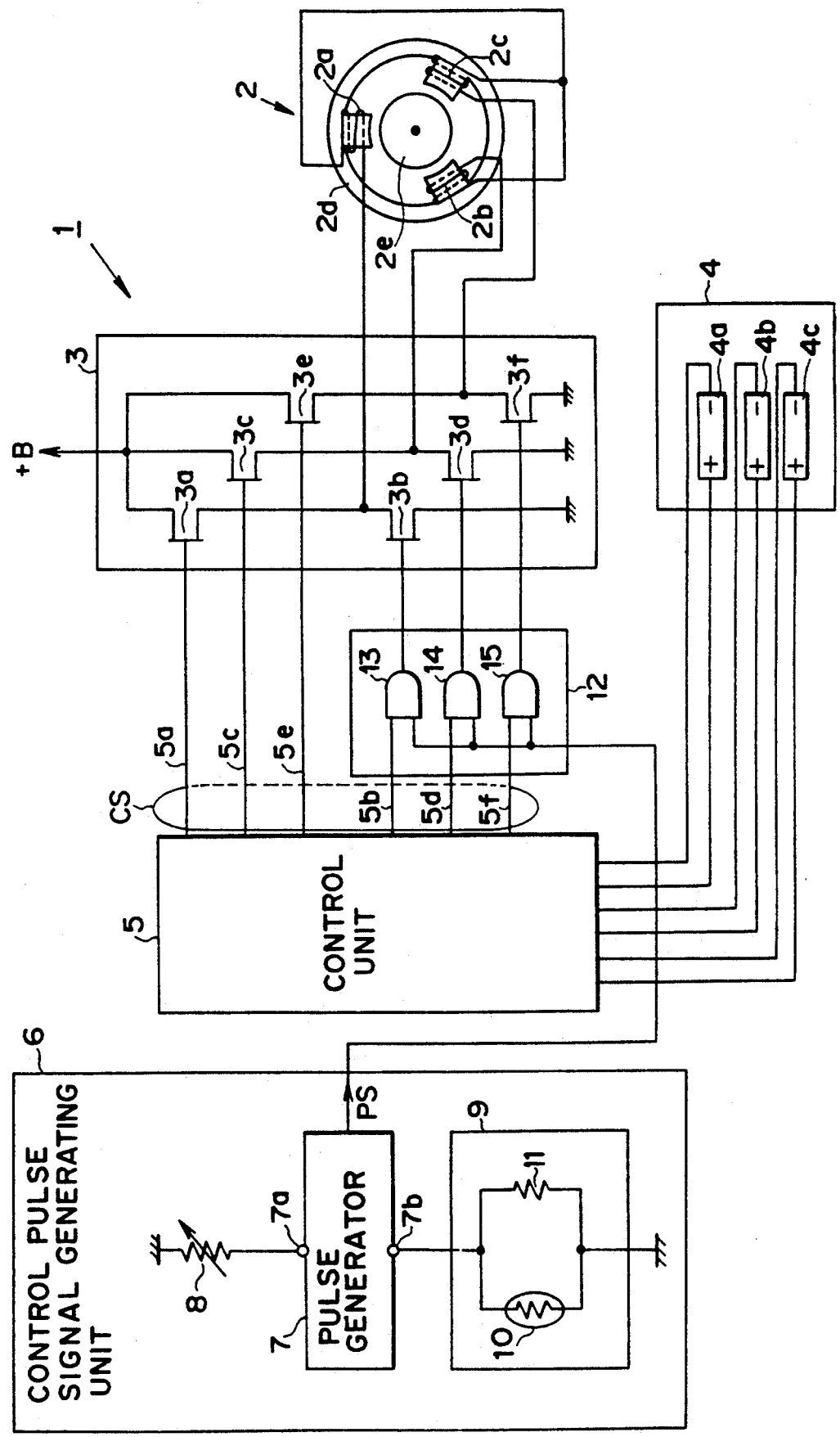
FIG. 1 is a circuit diagram of an embodiment of a control apparatus for controlling brushless d.c. motors according to the present invention.

In FIG. 1 reference numeral 1 generally designates an embodiment of a control apparatus for controlling a brushless or commutatorless d.c. motor 2, which is arranged according to the present invention. In this embodiment the brushless d.c. motor 2 is a three-phase motor of well-known design having a stator $2d$ with three exciting coils $2a$ to $2c$ and a magnet-rotor $2e$.

The control apparatus 1 is provided with a switching circuit 3 of well-known design for selectively supplying exciting current to the exciting coils $2a$ to $2c$ in the conventional manner, and the switching circuit 3 has switching transistors $3a$ to $3f$ connected as shown in FIG. 1. For detecting the rotational position of the magnet-rotor or the direction of the magnetic polarity thereof, a position sensor 4 having three hall elements $4a$ to $4c$ is incorporated into the motor 2. The hall elements $4a$ to $4c$ cooperate with the magnet-rotor $2e$ of the motor 2 to produce electric voltage signals indicating the rotational position of the magnet-rotor $2e$. A conventional d.c. bias circuit for providing d.c. bias current to these hall elements $4a$ to $4c$ is provided in the position sensor 4, but has been omitted from FIG. 1 in the interest of simplicity.

The electric voltage signals produced by the hall elements $4a$ to $4c$ of the position sensor 4 are applied to a control unit 5, by which a set of control signals CS for selectively driving the switching transistors $3a$ to $3f$ are produced on the output lines $5a$ to $5f$ of the control unit 5, whereby the exciting current necessary for continuing the rotating operation of the magnet-rotor can be supplied in sequence from the power source (not shown) to the exciting coils at an appropriate time in a conventional manner.

For controlling the rotational speed of the motor 2 in accordance with the duty cycle of a control pulse signal PS which is supplied from a control pulse signal generating unit 6, the control apparatus 1 has a current control circuit 12 having AND circuits 13 to 15, each of which has one input terminal receiving the control pulse signal PS. The other input terminals of the AND circuits 13 to 15 are connected with the output lines 5b, 5d and 5f, and the outputs of the AND circuits 13 to 15 are applied to the gates of the switching transistors 3b, 3d and 3f, respectively.

The output lines 5a, 5c and 5e are directly connected with the gates of the switching transistors 3a, 3c and 3e, respectively.

The control pulse signal generating unit 6 has a pulse generator 7 with two control ports 7a and 7b. One control port 7a is connected with one terminal of a variable resistor 8 acting as a speed setting device, and the other terminal of the variable resistor 8 is grounded. The resistance value of the variable resistor 8 varies with its setting, and the pulse generator 7 is arranged to change the duty cycle of the control pulse signal PS in accordance with the resistance value set by the variable resistor 8.

The other control port 7b is connected with a temperature detecting circuit 9 having a thermistor 10 with a positive temperature coefficient and a resistor 11 connected in parallel therewith, and the parallel circuit consisting of the thermistor 10 and the resistor 11 is connected between the control port 7b and ground. The thermistor 10 is disposed, for example, in the switching circuit 3 or adjacent to the switching transistors so as to detect the temperature of the switching transistors. In this case, the thermistor 10 is preferably disposed near the switching transistors 3b, 3d and 3f which are responsive to the control pulse signal PS through the AND circuits 13 to 15.

The resistance value of the parallel circuit consisting of the thermistor 10 and the resistor 11 changes in accordance with the temperature of the thermistor 10, that is, the resistance value between the port 7b and ground is related to the temperature of the switching transistors. In this case, the resistance value of the temperature detecting circuit 9 increases as the temperature of the switching transistors increases, and the pulse generator 7 produces the control pulse signal PS in such a way that the frequency of the control pulse signal PS decreases as the resistance value of the temperature detecting circuit 9 increases, that is, as the temperature of the switching transistors become higher.

As a result, as the temperature of the switching circuit 3 or the switching transistors becomes higher, the frequency of the ON/OFF operation of the switching transistors 3b, 3d and 3f of the switching circuit 3 decreases, so that the heat generated in these switching transistors 3b, 3d and 3f is suppressed. Thus, excessive increase in the temperature of the switching transistors can be prevented. In contrast, since the frequency of the control pulse signal PS increases as the temperature of the switching transistors decreases, the brushless d.c. motor 2 is driven in a smooth and stable condition because of the higher frequency of the control pulse signal PS. Thus, the motor 2 can be smoothly operated in such a way that the switching transistors do not overheat.

Figure 2:
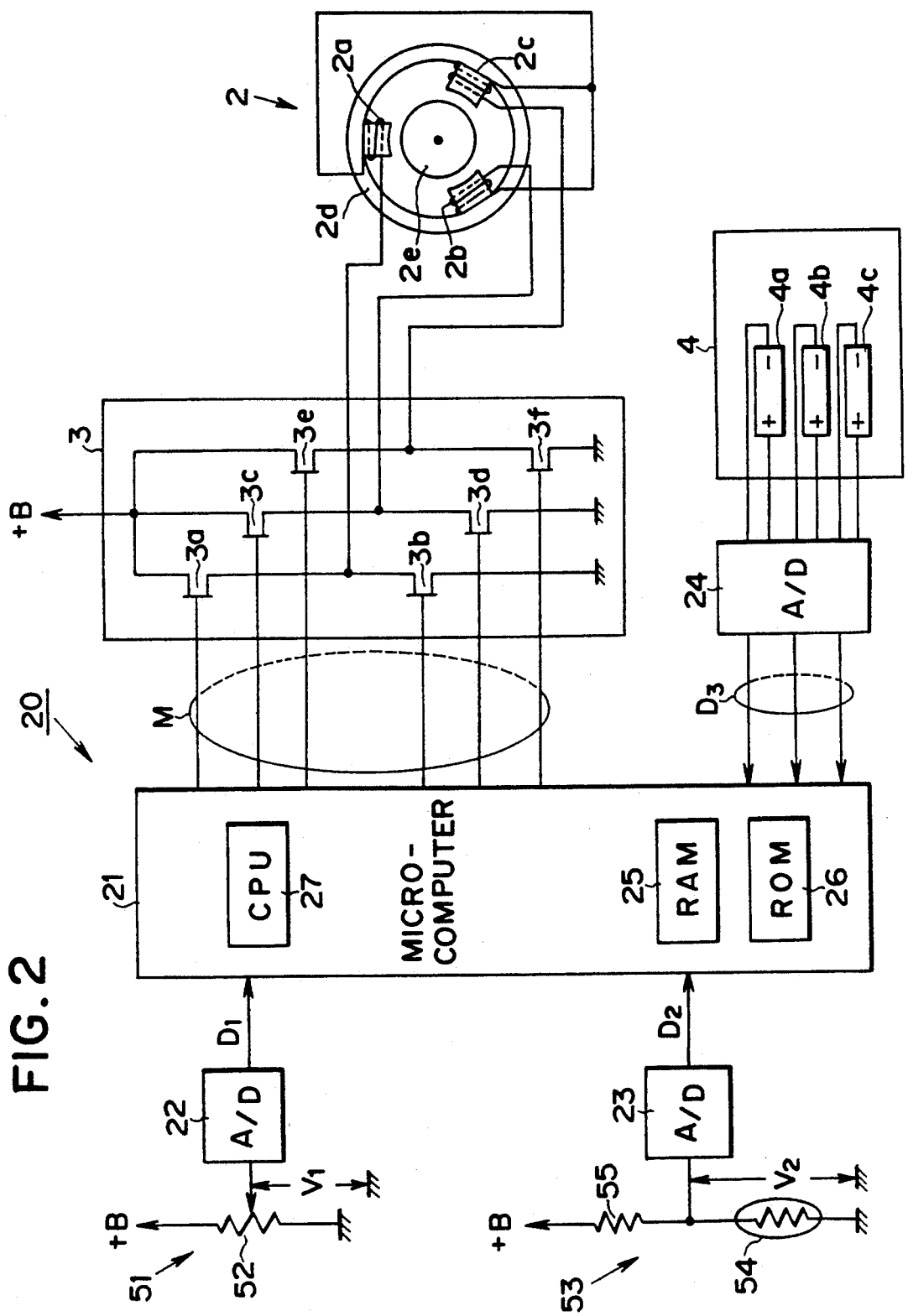
FIG. 2 is a view schematically showing another embodiment of a control apparatus for controlling brushless d.c. motors according to the present invention.

FIG. 2 shows another embodiment of a brushless d.c. motor control apparatus 20 according to the present invention, in which a conventional microcomputer 21 is employed for controlling the switching circuit 3 in a manner similar to the control apparatus 1 shown in FIG. 1. Each component in FIG. 2 corresponding to a component of the control apparatus 1 shown in FIG. 1 is designated by the same reference numeral and is not described further here.

For regulating the rotational speed of the motor 2, there is provided a speed setting unit 51 which has a variable resistor 52 for producing a voltage signal as a first control voltage signal $V_1$, the level of which is determined by the setting of the variable resistor 52.

On the other hand, for controlling the frequency of the pulsewise exciting current flowing through the exciting coils 2a to 2c in accordance with the temperature of the switching transistors, there is provided a temperature detecting unit 53, which is composed of a thermistor 54 and a resistor 55. The thermistor 54 is disposed, for example, in the switching circuit 3 or adjacent to the switching transistors so as to detect the temperature of the switching transistors, and the power source is connected through the resistor 55 to the thermistor 54. The voltage signal developed across the thermistor 54 is derived as a second control voltage signal $V_2$, the level of which is related to the temperature of the switching transistors.

The first and second control voltage signals $V_1$ and $V_2$ are applied to analog-digital converters (A/D) 22 and 23, respectively, to convert the signals $V_1$ and $V_2$ into digital form, and the resulting digital data $D_1$ and $D_2$ are applied to the microcomputer 21. The electric voltage signals produced by the hall elements 4a to 4c are applied to an analog-digital converter (A/D) 24 to convert them into digital form, and the resulting digital data $D_3$ are applied to the microcomputer 21.

The microcomputer 21 is mainly composed of a random access memory (RAM) 25, a read-only memory (ROM) 26 and a central processing unit (CPU) 27, and the digital data $D_1$ to $D_3$ are stored in the RAM 25. The digital data $D_1$ to $D_3$ are processed in the CPU 27 in accordance with a control program stored in the ROM 26 in advance, whereby functions substantially the same as those of the control unit 5, the pulse generator 7 and the current control circuit 12 of FIG. 1 can be realized. In other words, functions substantially identical to those performed by the control unit 5, the pulse generator 7 and the current control circuit 12 shown in FIG. 1 are performed by the microcomputer 21 in accordance with the control program stored in the ROM 26.

Figure 3:
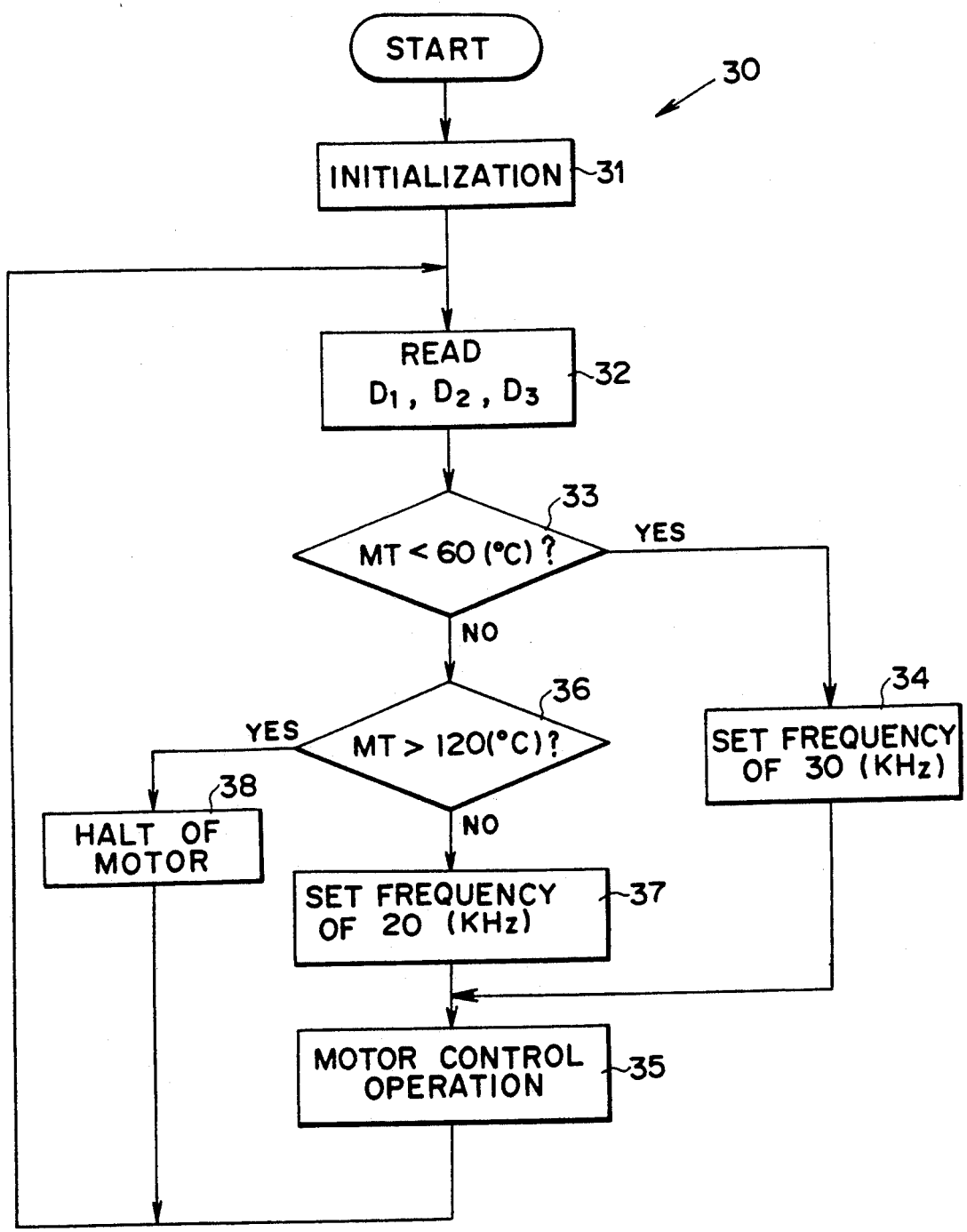
FIG. 3 is a flowchart of a control program for controlling the operation of the motor shown in FIG. 2, which is executed in the microcomputer system in the control unit of FIG. 2.

The control operation realized by means of the microcomputer 21 will now be explained with reference to the flowchart of FIG. 3 showing the control program 30 stored in the ROM 27.

The control program 30 is activated when the power source switch (not shown) of the brushless d.c. motor control apparatus 20 is turned on, and, at first, the operation moves to step 31, wherein an initialization operation is executed. Then, the digital data $D_1$ to $D_3$ are read in step 32. The operation then moves to step 33, wherein discrimination is made as to whether or not the temperature MT of the switching transistors detected by the thermistor 11 is less than 60° C. When MT is less than 60° C., the operation moves to step 34, wherein the duty frequency of the control pulse signal for controlling the exciting currents flowing through the exciting coils pulsewisely is set at a frequency of 30 kHz, and the operation moves to step 35.

In step 35 a three-phase motor control operation for rotating the magnet-rotor 2e at a speed set by the variable resistor 52 is carried out, and a group of driving pulse signals M for controlling the switching transistors 3a to 3f is output by the microcomputer 21. The switching circuit 3 is responsive to the group of driving pulse signals M to control the switching transistors 3a to 3f and the exciting coils 2a to 2c are excited in sequence to operate the motor 2 in the pattern of the pulse signal.

When the motor temperature MT is found to be not less than 60° C. in step 33, the operation moves to step 36, wherein discrimination is made as to whether or not MT is more than 120° C. When MT is not more than 120° C., the operation moves to step 37, wherein a duty frequency of 20 kHz is set for the control pulse signal. Then, the operation moves to step 35, wherein the operation of the motor 2 is controlled in a similar manner to the case of a duty frequency of 30 kHz.

When MT is found to be more than 120° C. in step 36, the operation moves to step 38, wherein a process for halting operation of the motor 2 is carried out. In addition, the operation of the program returns to step 32 when the execution of step 38 or 35 is terminated, and the operations described above are repeatedly carried out.

As described above, in the case of the control apparatus shown in FIG. 2 the motor 2 is operated by the use of the exciting current of a duty frequency of 30 KHz for a motor temperature of less than 60° C., and frequency of 20 KHz for a motor temperature between 60° C. and 120° C. The operation of the motor 2 is halted when MT is higher than 120° C. Thus, since the operation of the motor 2 is controlled in accordance with the temperature MT of the switching transistors, overheating and burnout of the switching transistors are effectively prevented, while smooth rotating operation of the motor 2 can be realized when the temperature of the switching transistors is low.

According to the control program shown in FIG. 3, one of the three operation conditions is selected on the basis of the temperature of the switching transistors. However, the present invention is not limited to the arrangement described above. For example, the operation condition of the motor 2 may be controlled steplessly in accordance with the temperature of the switching transistors.

Figure 4:
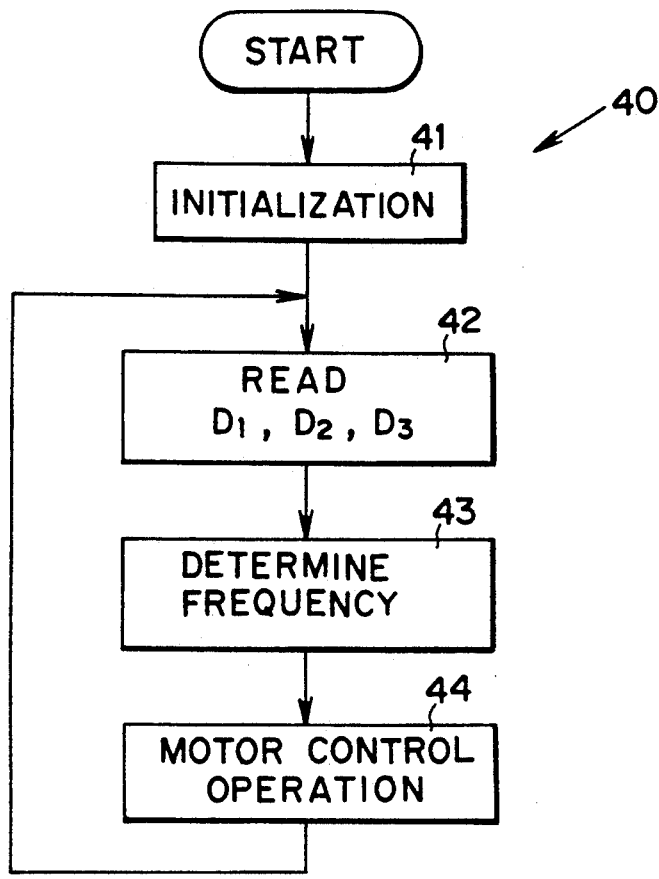
FIG. 4 is a flowchart of another control program for controlling the operation of the motor shown in FIG. 2, which is executed in the microcomputer system in the control unit of FIG. 2.

FIG. 4 shows a flowchart of another control program 40 for controlling the operation condition of the motor 2 shown in FIG. 2 in accordance with the detected temperature of the switching transistors. The control program 40 is also stored in the ROM 26 in advance and is executed in the CPU 27.

Figure 5:
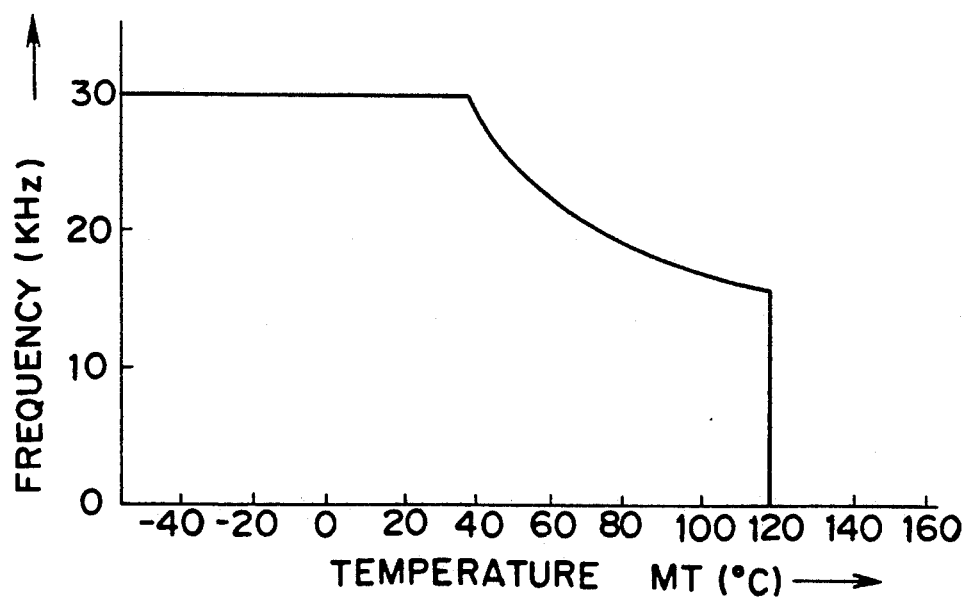
FIG. 5 is a characteristic curve which is used for determining the frequency of the exciting current in the control program of FIG. 4.

The initializing operation is executed in step 41 when the control program 40 is activated, and the operation then moves to step 42, wherein the data $D_1$ to $D_3$ are read in. In step 43 following step 42, the duty frequency of the exciting current is determined in response to the temperature MT by means of map calculation based on a table of map data stored in ROM 26 and corresponding to the characteristic curve shown in FIG. 5.

According to the relationship between the frequency of the exciting current and the temperature MT of the switching transistors, the frequency of the exciting currents remains constant at 30 kHz for a temperature less than 40° C., and decreases as the temperature MT increases in the range between 40° C. and 120° C. The frequency becomes zero when the temperature MT has reached 120° C., causing the rotating operation of the motor 2 to halt.

Returning to FIG. 4, the operation of the control program 40 then moves to step 44, wherein the control operation for the motor 2 is executed on the basis of the resulting frequency determined in step 43 and the data $D_1$ and $D_3$ in a manner similar to the operation executed in step 35 of FIG. 3, and then returns to step 42.

According to the control program 40, since the frequency of the exciting currents flowing through the exciting coils can be substantially determined steplessly in accordance with the temperature MT of the switching transistor, the motor 2 can be operated more smoothly, while the switching transistors are effectively prevented from overheating. As a result, high reliability of the operation of the motor 2 is ensured.

What is claimed is:

1. A control apparatus for controlling a brushless direct current motor comprising:
    a position sensor for detecting a rotational position of a rotor of the motor;
    switching circuit means for selectively supplying exciting current to a plurality of coils located on the stator side of the motor;
    setting means for producing a first signal for setting a preselected set rotational speed of the motor;
    detecting means for producing a second signal related to a temperature of a switching transistor or transistors of said switching circuit means;
    generating means responsive to the first and second signals for generating a pulse signal, the duty cycle of the pulse signal being established by the first signal to control the speed of said motor, said generating means comprising determining means responsive to the second signal for establishing the frequency of said pulse signal so that the frequency changes as the temperature of the switching transistor(s) changes to reduce power consumption and prevent overheating of said switching transistors; and,
    control means responsive to said position sensor and pulse signal for controlling said switching circuit means to supply the exciting current necessary for rotating the motor to the coils in a pulse pattern according to the pulse signal generated by said generating means.

2. A control apparatus as claimed in claim 1, wherein said position sensor has a plurality of hall elements which cooperate with the rotor to produce a set of electric signals representing the rotational position of the rotor.

3. A control apparatus as claimed in claim 1, wherein said generating means has a determining means responsive to the second signal for determining the frequency of the pulse signal generated in such a way that the frequency decreases as the temperature of the switching transistor(s) increases.

4. A control apparatus as claimed in claim 3, wherein the determining means determines the frequency of the pulse signal stepwisely.

5. A control as claimed in claim 3, wherein the determining means comprises means for storing map data corresponding to prescribed characteristics between the frequency of the pulse signal and the temperature of the switching transistor(s), and wherein the frequency of the pulse signal is determined from the map data in accordance with the second signal.

6. A control apparatus as claimed in claim 5, wherein the frequency of the pulse signal is set at zero when the temperature of the switching transistor(s) is more than a prescribed level, causing the rotation of the motor to halt.

7. A control apparatus as claimed in claim 1, wherein said detecting means includes a thermosensitive element located near the switching transistor(s).

8. A control apparatus as claimed in claim 7, wherein the thermosensitive element is a thermosensitive resistor whose resistance varies in accordance with its temperature.

9. A control apparatus as claimed in claim 1, wherein said generating means and said control means comprise a microcomputer, in which a control program for generating the pulse signal and controlling said switching circuit means is executed.

10. A control apparatus for controlling a rotational speed of a brushless direct current motor in accordance with a duty cycle of a control pulse signal for controlling by the use of switching transistors exciting current flowing pulsewise through exciting coils provided on a stator of the motor, said apparatus comprising;
   detecting means for detecting a temperature of at least one of the switching transistors; and
   determining means responsive to the detecting means for varying the control pulse signal frequency so as not to overheat the switching transistors.

11. A control apparatus as claimed in claim 10, wherein the motor comprises a magnet-rotor and a rotational position of the magnet-rotor is detected by the use of hall elements cooperating with the magnet-rotor.

12. A control apparatus for controlling a brushless direct current motor comprising:
   a position sensor for detecting a rotational position of a rotor of the motor;
   switching circuit means for selectively supplying exciting current to a plurality of coils located on the stator side of the motor;
   setting means for setting a preselected set rotational speed of the motor;
   detecting means for electrically detecting a temperature of a switching transistor or transistors of said switching circuit means;
   generating means responsive to said setting means and said detecting means for generating a pulse signal, the duty cycle of the pulse signal being controlled by the setting of said setting means, and said generating means comprising determining means for controlling the frequency of the pulse signal in response to a result of the detection by said detecting means such that the frequency changes as the temperature of the switching transistor(s) changes to maintain the power consumption and related temperature of said transistor(s) at a safe level; and
   control means responsive to said position sensor and the pulse signal for controlling said switching circuit means to supply the exciting current necessary for rotating the motor to the coils in a pulse pattern according to the pulse signal generated by said generating means.

13. A control apparatus as claimed in claim 12, wherein said position sensor has a plurality of hall elements which cooperate with the rotor to produce a set of electric signals representing the rotational position of the rotor.

14. A control apparatus as claimed in claim 12, wherein the frequency of the pulse signal generated by said generating means is determined in such a way that the frequency decreases as the temperature of the switching transistors increases.

15. A control apparatus as claimed in claim 14, wherein the frequency of the pulse signal is determined stepwisely.

16. A control apparatus as claimed in claim 12, wherein the frequency of the pulse signal is set at zero when the temperature of the switching transistors is more than a prescribed level, causing the rotation of the motor to halt.

17. A control apparatus as claimed in claim 12., wherein said detecting means includes a thermosensitive element disposed near the switching transistor or transistors.

18. A control apparatus as claimed in claim 17, wherein the thermosensitive element is a thermosensitive resistor whose resistance varies in accordance with its temperature.

* * * * *